(12) United States Patent
Koch (10) Patent No.: US 7,895,042 B2
(45) Date of Patent: *Feb. 22, 2011

(54) METHODS, SYSTEMS, AND PRODUCTS FOR INTERACTIVE VOICE RESPONSE

(75) Inventor: Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 244 days.

This patent is subject to a terminal disclaimer.

(21) Appl. No.: 12/335,783

(22) Filed: Dec. 16, 2008

(65) Prior Publication Data

US 2009/0092235 A1   Apr. 9, 2009

Related U.S. Application Data

(63) Continuation of application No. 11/582,032, filed on Oct. 17, 2006, now Pat. No. 7,472,068, which is a continuation of application No. 10/152,966, filed on May 22, 2002, now Pat. No. 7,127,400.

(51) Int. Cl.
  *G10L 11/00* (2006.01)
  *G10L 21/00* (2006.01)

(52) U.S. Cl. .................. 704/270.1; 704/260; 704/275; 379/265.09; 379/220.01; 379/88.16; 379/88.18; 379/88.21; 379/88.23; 379/211.02

(58) Field of Classification Search .................. None
  See application file for complete search history.

(56) References Cited

U.S. PATENT DOCUMENTS 5,946,386 A * 8/1999 Rogers et al. .......... 379/265.09
6,434,394 B1 * 8/2002 Grundvig et al. ............ 455/463

* cited by examiner

*Primary Examiner*—David R Hudspeth
*Assistant Examiner*—Justin W Rider
(74) *Attorney, Agent, or Firm*—Scott P. Zimmerman, PLLC (57) ABSTRACT

Methods, systems, and products are disclosed for administering a personal interactive voice response service. A personalized greeting is retrieved that is associated with a calling party and with a called party. The calling party's response to the greeting is received, and stored information is retrieved that is associated with the calling party's response and with the called party. The stored information is presented to the calling party.

20 Claims, 7 Drawing Sheets

METHODS, SYSTEMS, AND PRODUCTS FOR INTERACTIVE VOICE RESPONSE

CROSS-REFERENCE TO RELATED APPLICATIONS

This application is a continuation of U.S. application Ser. No. 11/582,032, filed Oct. 17, 2006 and now issued as U.S. Pat. No. 7,472,068, which is a continuation of U.S. application Ser. No. 10/152,966, filed May 22, 2002, and now issued as U.S. Pat. No. 7,127,400, with both applications incorporated herein by reference in their entirety.

FIELD OF THE INVENTION

The present invention relates to telecommunications and more particularly relates to systems and methods for enabling a telephone subscriber to customize the handling of incoming calls using interactive voice response (IVR).

BACKGROUND OF THE INVENTION

Not long ago, telephone services were considered necessary but expensive such that a household typically had a single telephone line to serve all of the household members. Today, telecommunications technologies have greatly expanded and telephone services have become less expensive. Many households now have two or more telephone lines, and many people carry portable telephones, also known as mobile or cellular telephones. Some households may have added a second home telephone line for a young child, an aging parent, a fax machine, or a dial-up Internet connection. Additionally, each member of the household may have a separate mobile phone with a mobile phone number unique to that member.

However, there is rarely a home telephone line for each member of the household, and if a household includes a large number of people, it is not practical to have a home telephone line for each person. Furthermore, there are occasions when mobile phones must be turned off or may not provide quality or affordable service. People may also be wary of providing their mobile phone number to others who are not either close friends or relatives. Accordingly, having a primary telephone line for all members of a household is still important to most residential telephony customers.

When a telephone rings at a house, a user may answer the call only to learn that the call is for a child who is not at home. The user may take a message for the child on a piece of paper and leave the message for the child to see. Alternatively, the call could be for the user's spouse, who may be on a business trip, but reachable through a mobile phone. In this case, the user may provide the mobile phone number to the calling party, so the calling party may call the user's spouse directly. Alternatively, the call could be from someone, e.g., inquiring about a newspaper advertisement to sell one of the family's cars. The user may not wish to answer the call at that time, but instead direct the call to a voice mailbox for later retrieval or to play a specific message with further information about the car.

In an environment in which a telephone number is shared by a number of people, a caller frequently does not have control over routing its call to a specific member of the shared environment. The called party does not have a convenient way to specify incoming call routing instructions based on which member of the household the caller is trying to reach. Additionally, the called party has no means by which to route an incoming call to a specific member based on the topic of the call, e.g., a caller inquiring about a newspaper ad selling a used car. Furthermore, the called party has no way to route an incoming call to a specific recorded message (e.g., driving directions to an upcoming party) based on input from the caller.

When more than one person is associated with a telephone line, incoming calls may be for several different people and varying purposes. Even in situations where there is only one person associated with a telephone line, the user cannot generally specify how to handle incoming calls based on the caller's purpose. Thus, there is a need for a system and method allowing residential customers to specify the handling of incoming calls.

Residential telephony customers typically do not enjoy many of the features and services related to management of incoming calls that are available to business customers. One reason for this is the high cost of the customer premises equipment (CPE) required to provide such features. Thus, interactive voice response (IVR) systems have historically been used only in business environments for the handling of incoming calls.

Prior IVR systems are large, expensive, and self-contained. Typically, a stand-alone box containing the IVR system is connected to one or more trunk lines for the business. When an incoming call reaches a trunk line, the caller typically hears a menu of choices, e.g. "press the extension of the person you wish to reach; press 1 for a company directory; or press 0 for the operator." These menus are preprogrammed in a customized terminal that is usually adjacent to the stand-alone box that houses the IVR system. Additionally, the IVR system requires prerecorded announcements and plays the same menus to all callers, even though there may be hundreds of people served by the trunk lines connected to the IVR system. Thus, IVR systems utilized by businesses are not desirable for residential customers because of the expense and lack of customization available. Accordingly, there is a need for a system and method of providing a network-based personal IVR service that enables residential customers to customize the manner in which incoming calls are handled.

SUMMARY OF THE INVENTION

The present invention provides a personal IVR system with a web-based interface allowing the user to specify treatment of incoming calls based on voice or touchtone responses provided by the calling party. A graphical user interface (GUI) available over a computer network, such as the Internet, allows the user to personalize greetings that callers hear, as well as customizing treatment of callers based on the caller's response to the played greeting.

For example, the user may specify an initial greeting that plays "Thank you for calling. If you are calling for Jim, press 1; for Mary, press 2; for the kids, press 3." Topic-specific prompts may also be included in a initial greeting, e.g., "for directions to the party, press 4; for information about the used car advertised for sale, press 5." The directions and information about the car are available to the user based on the user's selection. The user could choose to record an initial greeting or other messages, either over the telephone or over the Internet, so that the messages are played to callers in the user's voice. Additionally, the user may enter text, via a PC or wireless device connected to the Internet, that is played back for the caller, based on the caller's response, via text-to-speech conversion using voice extensible markup language (VoiceXML or VXML) technology.

Resulting actions, such as call forwarding, distinctive ringing, or remote notification of the incoming call may also be included. The telephone network may be either AIN or softswitch/server-based architecture. These and other objects, features, and advantages of the present invention may be more clearly understood and appreciated from a review of the following detailed description of the disclosed embodiments and by reference to the appended drawings.

DETAILED DESCRIPTION OF THE INVENTION

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| AIN | Advanced Intelligent Network |
| ASR | Automated Speech Recognition |
| CPE | Customer Premises Equipment |
| DTMF | Dual Tone Multi-Frequency |
| GUI | Graphical User Interface |
| IP | Intelligent Peripheral |
| ISDN | Integrated Service Digital Network |
| ISP | Internet Service Provider |
| IVR | Interactive Voice Response |
| IXC | Interexchange Carrier |
| LEC | Local Exchange Carrier |
| MGCP | Media Gateway Control Protocol |
| PC | Personal Computer |
| PDA | Personal Digital Assistant |
| PIN | Personal Identification Number |
| POTS | Plain Old Telephone Server |
| PRI | Primary Rate Interface |
| PSTN | Public Switched Telephone Network |
| SCN | Service Circuit Node |
| SCP | Service Control Point |
| SIP | Session Initiation Protocol |
| SMS | Service Management System |
| SPA | Service Package Application |
| SS7 | Signaling System 7 |
| SSP | Service Switching Point |
| STP | Signal Transfer Point |
| TCAP | Transaction Capabilities Application Part |
| TCP/IP | Transmission Control Protocol/Internet Protocol |
| TTS | Text-to-Speech |
| VXML or VoiceXML | Voice Extensible Markup Language |
| WAP | Wireless Application Protocol |

TABLE 1-continued

| ACRONYM | DEFINITION |
| --- | --- |
| WSP | Wireless Service Provider |
| XML | Extensible Markup Language |

Voice extensible markup language (VoiceXML or VXML), is an XML format that utilizes existing telephony technology to interact with users over the telephone through speech recognition, speech synthesis, and standard web technologies. Lucent®, AT&T®, IBM®, and Motorola® founded the VoiceXML Forum to create a unified standard for voice dialogs. Part of the driving force behind the development of VXML is the use of IVR systems for call center automation.

VXML promotes service portability across implementation platforms. VXML is a common language for content providers, tool providers, and platform providers and strives to accommodate the requirements of a majority of voice response services. The language describes the human-machine interaction provided by voice response systems, which includes: output of synthesized speech (text-to-speech); output of audio files; recognition of spoken input; recognition of dual-tone multi-frequency (DTMF) input; recording of spoken input; control of dialog flow; and telephony features such as call transfer and disconnect.

An exemplary VXML system includes a VXML gateway that accesses static or dynamic VXML content on the Internet. The gateway includes a VXML browser (interpreter), a Text-to-Speech (TTS) engine, an Automatic Speech Recognition (ASR) engine, and the telephony hardware that connects to the Public Switched Telephone Network (PSTN) via a T1, Plain Old Telephone Server (POTS), or Integrated Service Digital Network (ISDN) telephone connection. A POTS line is the type installed in most homes and can only handle a single connection, whereas a T1 contains 24 individual channels. VXML gateways contain one or more telephony cards that handle things such as digital signal processing, call control, and call bridging. Most of the vendors of these cards support a wide range of connection options including T1, E1, POTS, and ISDN.

An exemplary voice dialog utilizing VXML typically includes several steps. First, a caller dials up the system, and the call is received by the telephony hardware and routed to the VXML browser. The VXML gateway retrieves a VXML document from the specified web server and plays a prerecorded or synthesized prompt. Next, the caller speaks into the telephone or presses a key (DTMF input) to indicate a selection based on the played prompt. The telephony equipment sends the recorded sound to the ASR engine (if it's speech), which uses a predefined grammar contained in the VXML document. The VXML browser then executes the commands in the document based upon the ASR results (a match against the grammar or not) and plays another prerecorded or synthesized prompt and waits for the caller's response.

Automated speech recognition uses recorded audio from a telephony card and advanced algorithms to match the recorded audio against dictionary and grammars. A grammar defines sets of words and phrases that it expects the callers to speak. TTS engines use a number of algorithms that utilize prerecorded speech to form the sounds for words. As a starting point, the basic phonemes of the language to be spoken are recorded and filed away. These phonemes are then combined to form words using a lexicon that tells the TTS engine what phonemes make up a particular word. The words are combined to form sentences and so on until the TTS engine has built the entire phrase, which is usually returned as a "wav" file. As is known in the art, a "wav" file is a Microsoft® Windows® proprietary format for encoding sound and is designated by the ".wav" extension.

A document server, e.g., a web server, processes requests from a client application, the VXML Interpreter, through the VXML interpreter context. The server produces VXML documents in reply, which are processed by the VXML Interpreter. The VXML interpreter context may monitor caller inputs in parallel with the VXML interpreter. For example, one VXML interpreter context may always listen for a special escape phrase that takes the caller to a high-level personal assistant, and another may listen for escape phrases that alter caller preferences like volume or text-to-speech characteristics.

The implementation platform is controlled by the VXML interpreter context and by the VXML interpreter. For instance, in an IVR application, the VXML interpreter context may be responsible for detecting an incoming call, acquiring the initial VXML document, and answering the call, while the VXML interpreter conducts the dialog after answer. The implementation platform generates events in response to caller actions (e.g., spoken or character input received, disconnect) and system events (e.g., timer expiration). Some of these events are acted upon by the VXML interpreter itself, as specified by the VXML document, while others are acted upon by the VXML interpreter context.

Further information, including hardware/software platform requirements, may be found in Voice XML Version 2.0 by VoiceXML Forum, said document being incorporated herein by reference in its entirety.

Figure 1:
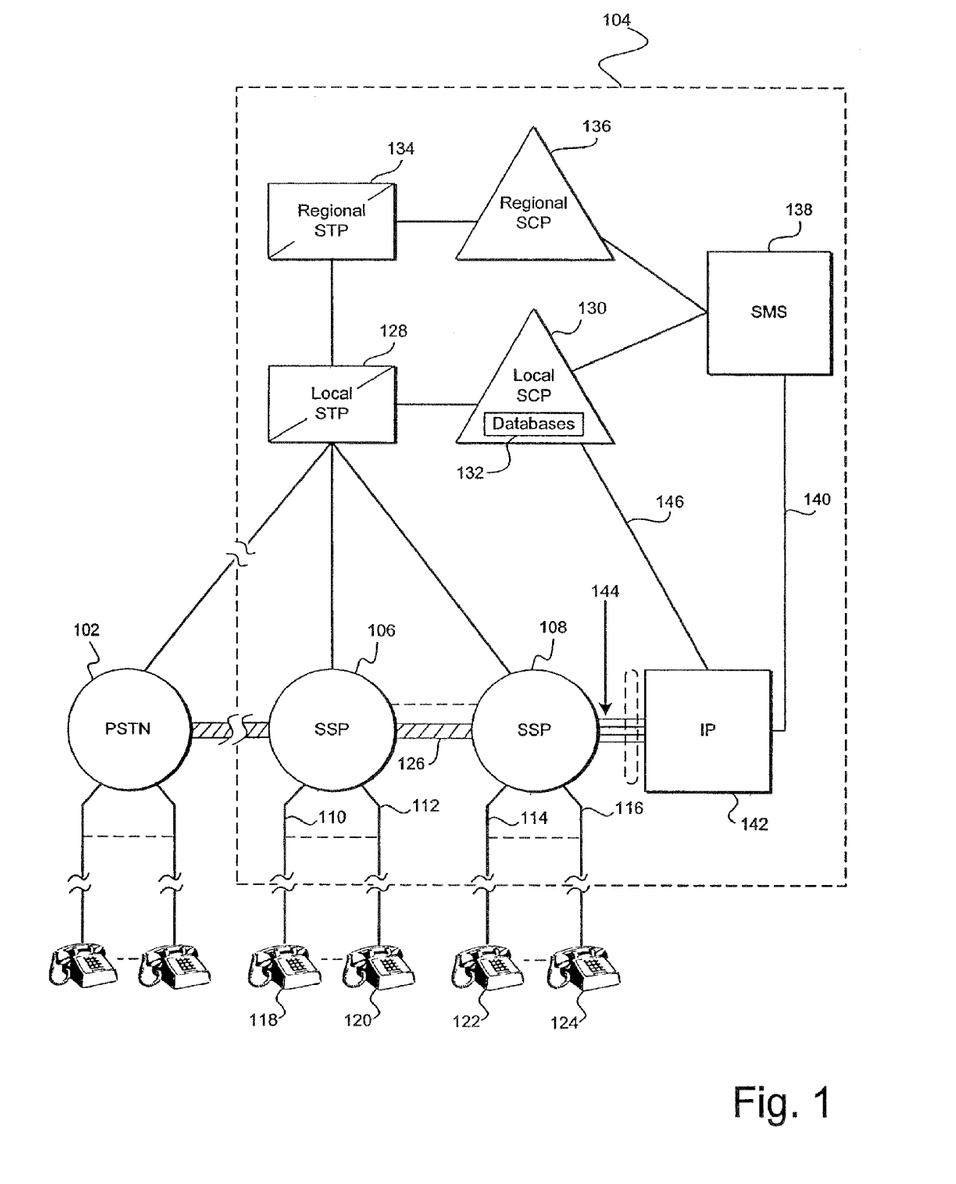
FIG. 1 illustrates an exemplary AIN environment of exemplary methods and systems of operation of the present invention.

FIG. 1 is a diagram of an exemplary environment for operation of exemplary methods and systems of the present invention. Connected to a public switched telephone network (PSTN) 102, an exemplary environment is an Advanced Intelligent Network (AIN) 104. For brevity, only a basic explanation of AIN 104 is provided. Where AIN 104 operates or is composed differently in an important aspect from that which would be understood by those skilled in the art, additional details are provided herein. For further information regarding the referenced AIN 104 and aspects thereof, the interested reader is referred to the commonly assigned patent to Weisser, U.S. Pat. No. 5,430,719, which is incorporated herein by reference.

AIN 104 includes a variety of interconnected network elements. A group of such network elements includes the plurality of central offices which are indicated as service switching points (SSPs) 106 and 108 in FIG. 1. An SSP typically includes switch functionality, but also includes other functionality so as to communicate with other AIN elements as those skilled in the art understand. As further illustrated in FIG. 1, SSPs 106 and 108 have a plurality of subscriber lines, or calling lines, connected thereto. Each SSP serves a designated group of calling lines, and thus, the SSP that serves a particular calling line may be referred to as its serving SSP. For example, SSP 106 serves calling lines 110 and 112, while SSP 108 serves calling lines 114 and 116. Each calling line is connected typically to a piece of terminating equipment including a plurality of telephones individually referenced as 118, 120, 122, and 124. Although telephones are illustrated as the pieces of terminating equipment in FIG. 1, those skilled in the art will understand that such pieces include other telecommunications devices such as facsimile machines, computers, modems, etc.

Pursuant to a preferred embodiment, each active calling line in an AIN is assigned a multi-digit calling directory number. In the U.S., the directory number typically consists of ten digits. In the description of the present invention, the term "directory number" is used in its generally understood meaning to be the number which is dialed or input by a caller or source and used by the network to route the communication so as to reach a piece of terminating equipment on a calling line associated with the dialed directory number. A directory number is commonly referred to as a telephone number or calling line number.

SSPs 106 and 108 are interconnected by a plurality of trunk circuits 126. These are the voice path trunks that interconnect the SSPs to connect communications. The term "communication" or "call" is used herein to include all messages that may be exchanged between a caller (or calling party or originating party or subscriber) and a called party or destination.

Each of SSPs 106 and 108 is connected to another type of AIN element referred to as a local signal transfer point (STP) 128 via respective data links using the Signaling System 7 (SS7) protocol, which is well known in the art. Much of the intelligence of the AIN resides in yet another type of AIN element referred to as a local service control point (SCP) 130 that is connected to STP 128 over an SS7 data link. Among the functions performed by SCP 130 are the maintenance of network databases and subscriber databases as represented collectively by databases 132. Databases 132 may be used in providing telecommunication services to a subscriber. Typically, SCP 130 includes service package applications (SPAs) that are used in connection with or as part of databases 132 in the application of telecommunication services or enhanced features to calling lines.

The local STP 128 may be connected to other network elements of AIN 104 through a regional STP 134, which in turn may be connected to a regional SCP 136. Both regional SCP 136 and local SCP 130 are connected via respective data links to a service management system (SMS) 138. SMS 138 interfaces to business offices of the local exchange carrier (LEC) and interexchange carriers (IXCs).

In order to keep the processing of data and calls as simple as possible, a relatively small set of triggers is defined at the SSPs for each call. There are three types of triggers: originating, terminating, and dialing plan. With regard to the present invention, a trigger in the AIN is an event associated with a particular calling line (i.e., terminating) that generates a message to be sent to an SCP. The trigger causes the SCP to query its service package applications and databases for processing instructions with respect to the particular call. The results are sent back to the SSP in a response from SCP 130 through STP 128. The return message includes instructions to the SSP as to how to process the call. The instructions may be to tell the SSP to take some special action as a result of a customized calling service or enhanced feature, such as a personal dialing plan. In response, the SSP moves through its remaining call states, collects the dialed digits, and may generate further messages that are used to set up and route the call. Similar devices for routing calls among various local exchange carriers are provided by regional STP 134 and regional SCP 136.

SMS 138 also is connected via a data link 140 to one or more intelligent peripherals such as the illustrated intelligent peripheral (IP) 142. In an exemplary environment, IP 142 may be a service circuit node (SCN). By this data link 140, SMS 138 provides IP 142 with information relating to new subscribers and updates for existing subscribers, and with information relating to network operations such as new services, upgrades to existing services, measurements, audits, and maintenance. The IP 142 that receives information from SMS 138 may be one of many kinds of elements used in telecommunication services. IP 142 includes voice and DTMF signal recognition devices and voice synthesis devices.

In addition, IP 142 is connected to one or more (but usually only a few) SSPs via ISDN links 144 as shown by the connection to SSP 108. Optionally, IP 142 may be connected to one or more SCPs via a TCP/IP connection, such as TCP/IP connection 146 which connects IP 142 to SCP 130.

Figure 2:
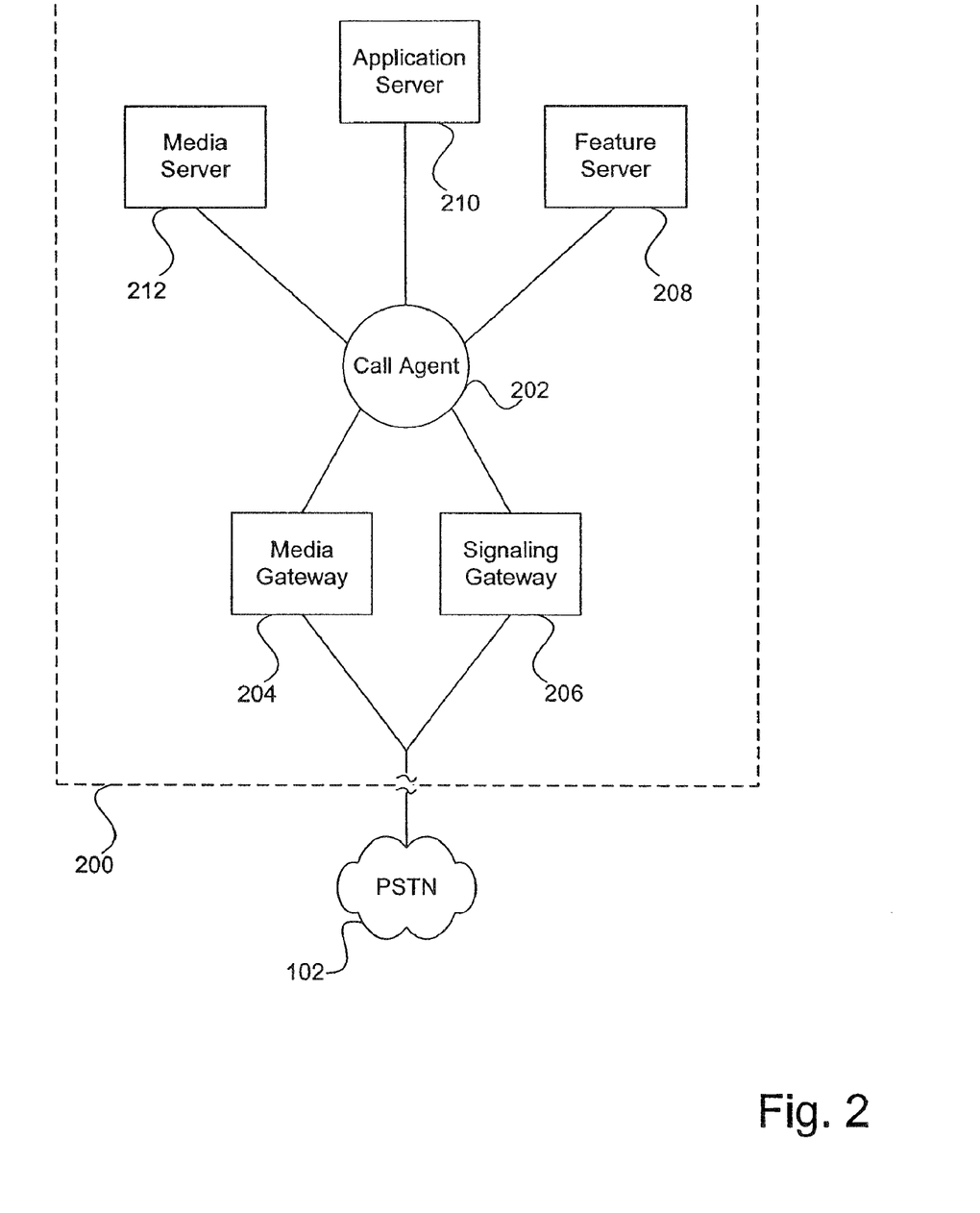
FIG. 2 illustrates an exemplary softswitch environment of exemplary methods and systems of operation of the present invention.

In another exemplary environment, a softswitch may be used instead of an SSP. A softswitch is a software-based entity that provides call control functionality. As shown in FIG. 2, elements in a softswitch architecture network 200 include a softswitch/call agent/media gateway controller 202, a media gateway 204, a signaling gateway 206, a feature server 208, an application server 210, and a media server 212. A softswitch may interoperate with the PSTN 102 through media gateway 204 and signaling gateway 206 via signaling to PSTN switches and AIN platforms. Signaling gateway 206 and media gateway 204 are deployed at the boundary between the PSTN and the softswitch. All other components may be located anywhere within the network that makes sense with regard to access and operational considerations. The softswitch network may access network elements in the PSTN for routing, billing, emergency services, and other services as needed.

Feature server 208 is related to the features of call agent 202. Feature server 208 may be built into call agent 202 without distinction between the functions, to provide call-associated capabilities such as call waiting, three-way calling, speed dial, and other features that are applied to a call. Application server 210 provides services that may result in the termination of a call (e.g., voice mail, conference bridge, etc.) or delivering services and information to an end user. Application server 210 can be coupled to data networks, such as the Internet, to gain access to information systems to provide services to the user.

Call agent 202 interfaces with media server 212 using protocols such as MGCP (media gateway control protocol), H.248, or SIP (session initiation protocol), which are well known to those skilled in the art, to direct media server 212 to provide necessary media interactions as part of delivering services. Call agent 202 delivers calls to application server 210 using SIP or H.323 protocols, which are well known to those skilled in the art. Application server 210 takes over the call and may drive media server 212 as needed to provide necessary media interactions as part of delivering services.

Media gateway 204 is an endpoint or collection of endpoints. The primary role of media gateway 204 is to transform media from one transmission format to another, most often from circuit to packet formats or from analog/ISDN circuit to packet as in a residential gateway. Media gateway 204 is always controlled by a media gateway controller, such as call agent 202. Media server 212 operates as a slave to call agent 202 to perform media processing on media streams. Media server 212 provides support for multiple codecs and transcoding, support for control by multiple media gateway controller functions, and support for multiple concurrent building blocks.

Systems and methods according to the present invention include a network-based personal IVR service that is configurable by the subscriber or user in real time. The user specifies what the caller hears, e.g., "press 1 for Sue, press 2 for Jim." The user also specifies the call handling rules that apply to each incoming call. Additionally, other screening and call notification features may be used, as well as distinctive ringing. Initial greetings, options, and call handling rules may be entered via a computer network, such as the Internet.

Examples of such rules are to forward calls to a forwarding number, to play an initial greeting, etc. The rules or instructions can be quickly changed via the Internet and can be customized for each directory number that is subscribed to personal IVR service. To include specific information to be provided to callers as part of the personal IVR service, there are two options: (1) type in the information and it is played to the caller using a TTS engine, or (2) store a prerecorded announcement.

Figure 3:
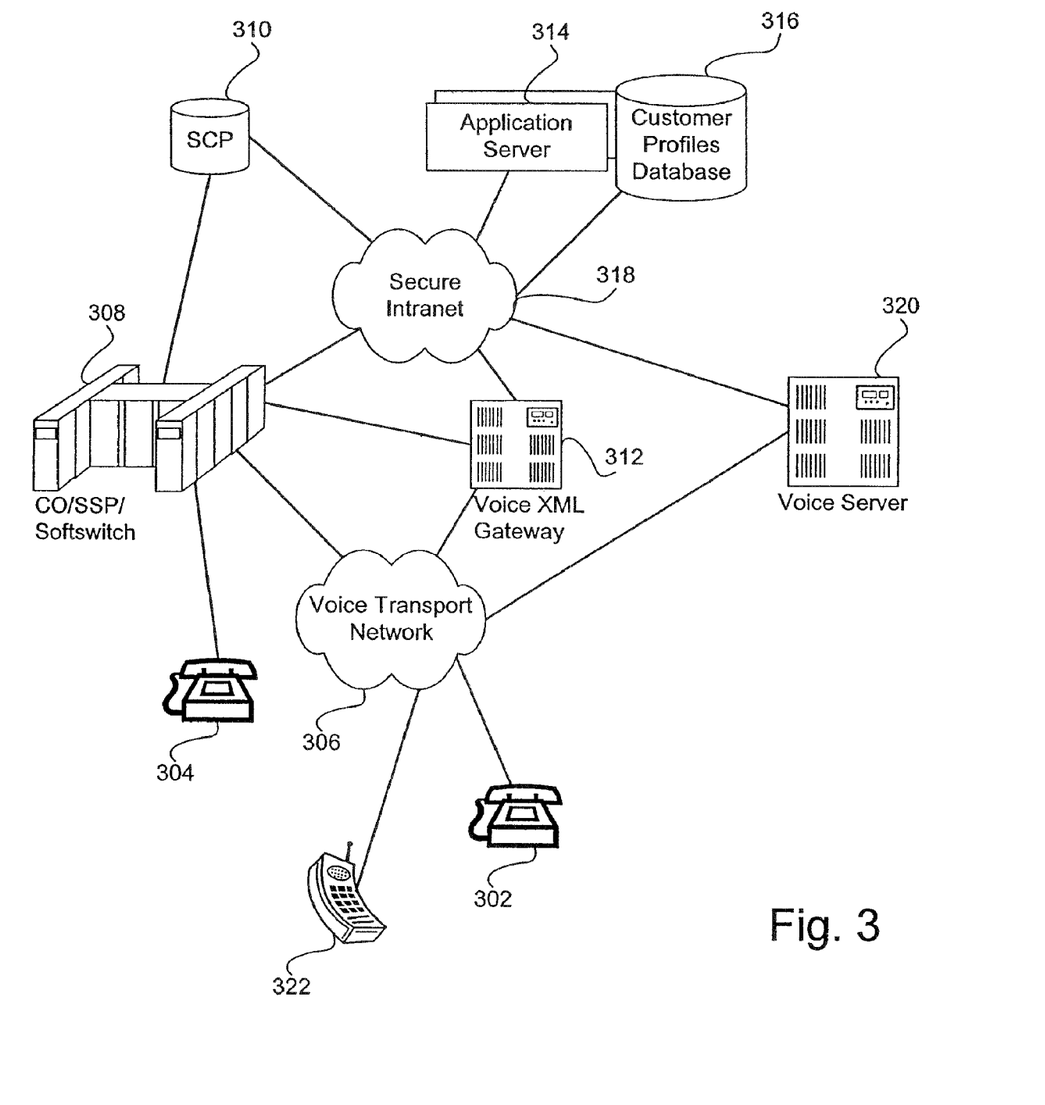
FIG. 3 illustrates an exemplary environment of exemplary methods and systems of call processing of the present invention.

FIG. 3 depicts an exemplary environment for operation of exemplary methods and systems of the present invention. A caller 302 or 322 desires to call a user 304 who is subscribed to personal IVR service. The call is routed to the directory number for user 304 using a voice transport network 306, which triggers a central office or switch 308 serving user 304. Central office 308 queries an SCP 310 serving user 304 for processing instructions with respect to the call. SCP 310 determines that user 304 is subscribed to personal IVR service. SCP 310 accesses an application server 314 and a customer profiles database 316, which includes call handling rules and text previously entered by user 304 through a web-based interface or other means, via a secure intranet 318.

The text or prerecorded announcement that is to be played for caller 302 is sent back to SCP 310 along with instructions to route the call to a VXML gateway 312. With the assistance of a voice server 320 accessed via secure intranet 318, VXML gateway 312 plays a prerecorded or synthesized prompt to caller 302 using the services of voice transport network 306. VXML gateway 312 and voice server 320 may separate, as shown in FIG. 3, or combined. For example, the synthesized prompt may be "press or say 1 for John; press or say 2 for Mary; or press or say 3 for the kids." VXML gateway 312 then waits for an audible or DTMF response from caller 302.

Caller 302 or 322 speaks into the telephone or presses a key to indicate a selection based on the played prompt. VXML gateway 312 collects the response and returns the response to central office 308. Central office 308 returns the response to SCP 310 and queries SCP 310 for instructions. SCP 310 accesses database 316 to determine the next step based on the response from the caller. For example, information stored in database 316 may provide that when a caller presses or says "2" between the hours of 8:00 a.m. and 6:00 p.m. on Monday through Friday, the call is to be forwarded to a mobile phone (in this example, Mary's mobile phone). Accordingly, if caller 302 or 322 presses "2," SCP 310 instructs central office 308 to route the call to Mary's mobile phone.

As another example, information stored in database 316 may provide that when a caller presses or says "2" for Mary, another prerecorded or synthesized prompt should be played and that VXML gateway 312 should wait for another response from caller 302 or 322. For example, the prompt may be "press or say 1 if you would like to be forwarded to Mary's mobile phone; press or say 2 if you would like to be forwarded to Mary's work phone; or press or say 3 if you would like to leave a message for Mary." Caller 302 or 322 makes a selection and is either forwarded to Mary's mobile or work phone number or directed to Mary's voice mail based on the caller's selection.

Figure 4:
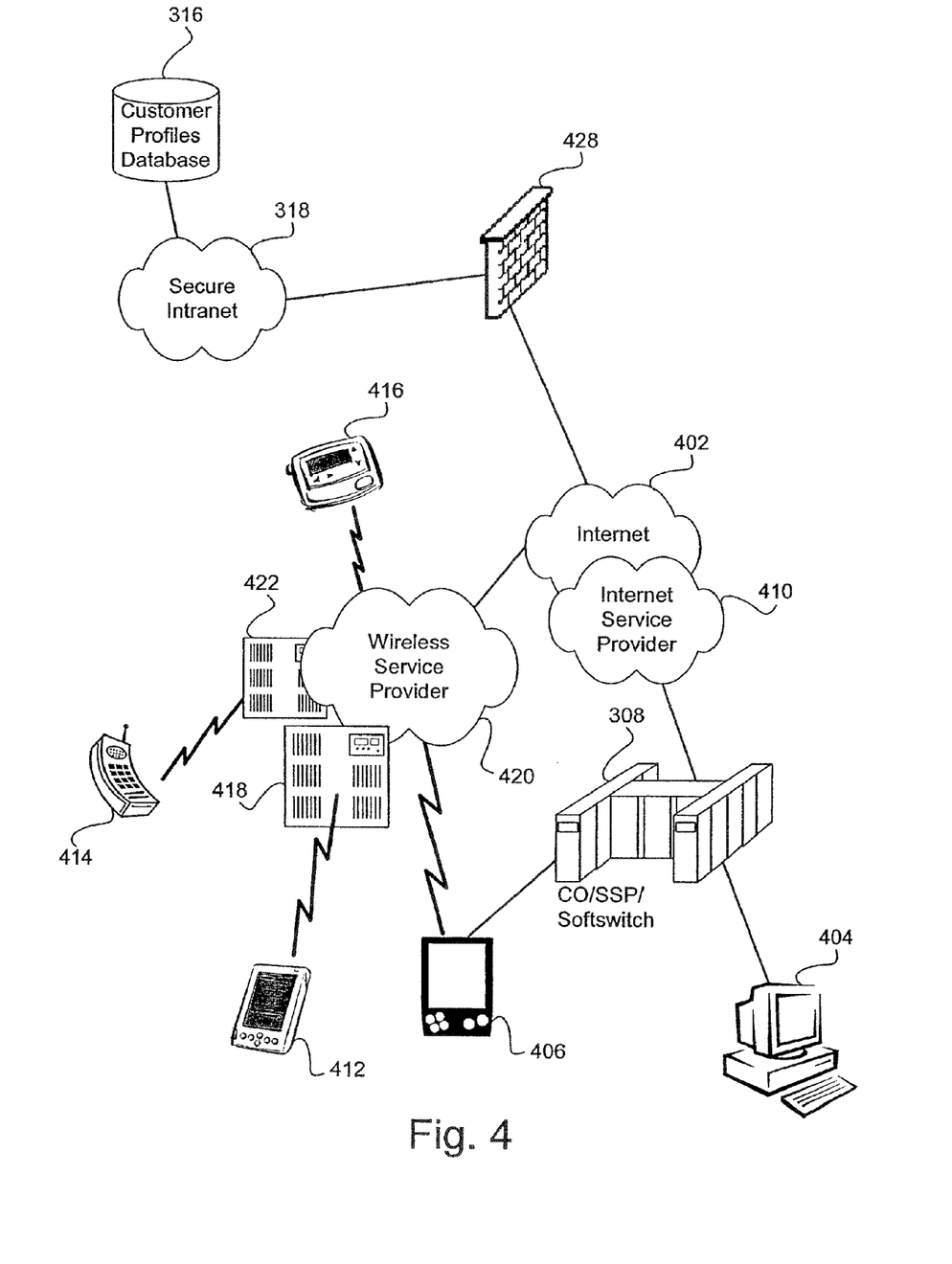
FIG. 4 illustrates an exemplary environment of exemplary methods and systems of implementing a personal IVR service according to the present invention.

FIG. 4 shows an exemplary operating environment for an embodiment of the present invention. To control customer settings, call handling rules, and preferences related to IVR service, a user employs either a wireline or a wireless device to connect to the Internet 402. Examples of a wireline device include a personal computer (PC) 404 or a Pocket PC 406. In general, a user of a wireline device connects to the Internet 402 via a central office (SSP or softswitch) 308 and employs services provided by an Internet service provider ("ISP") 410.

Examples of wireless devices that a customer can use to interface with the Internet 402 include Pocket PC 406, a Personal Digital Assistant (PDA) 412, a Wireless Application Protocol (WAP) device 414, or an interactive pager 416. A user of PDA 412 connects to the Internet 402 via a web access gateway 418 and employs services provided by a wireless service provider (WSP) 420. A user of WAP device 414 connects to the Internet 402 via a WAP gateway 422 and employs services provided by WSP 420. A user of interactive pager 416 or Pocket PC 406 also employs services of WSP 420.

The user connects to the Internet 402 and enters information regarding customer control settings for IVR service. The information entered by the user is transmitted to a secure intranet 318 of the IVR service provider and stored in a customer profiles database 316. A firewall 428 protects intranet 318 as information is transmitted between intranet 318 and the Internet 402.

The present invention provides a convenient web-based means to administer a personal IVR service. For example, the user may create rules to route calls based on any of the following: to a pre-defined number, to a current reach number (e.g., Mary's current reach number based on her calendar), to a current person's reach number (e.g., containing the current reach number for both "Mary at work" and "Mary at home"), to wherever the called party is based on presence information (e.g., route to Mary's mobile phone if the mobile phone is on), or to a prerecorded or synthesized announcement. Additionally, different actions may be taken at different times. For example, the user may request that calls be forwarded to forwarding number A from noon to 3 p.m. and forwarded to forwarding number B from 3 p.m. to 7 p.m. The user can create, edit, or delete greetings, options, or rules via the web-based interface. The user may also want call handling based on specific situations or topics, for example "press 4 if you are calling about the car, press 5 if you are calling for directions to the party on Saturday." Based on what the caller enters, there are rules directing where the call is routed and/or what announcement is played for the caller.

Figure 5:
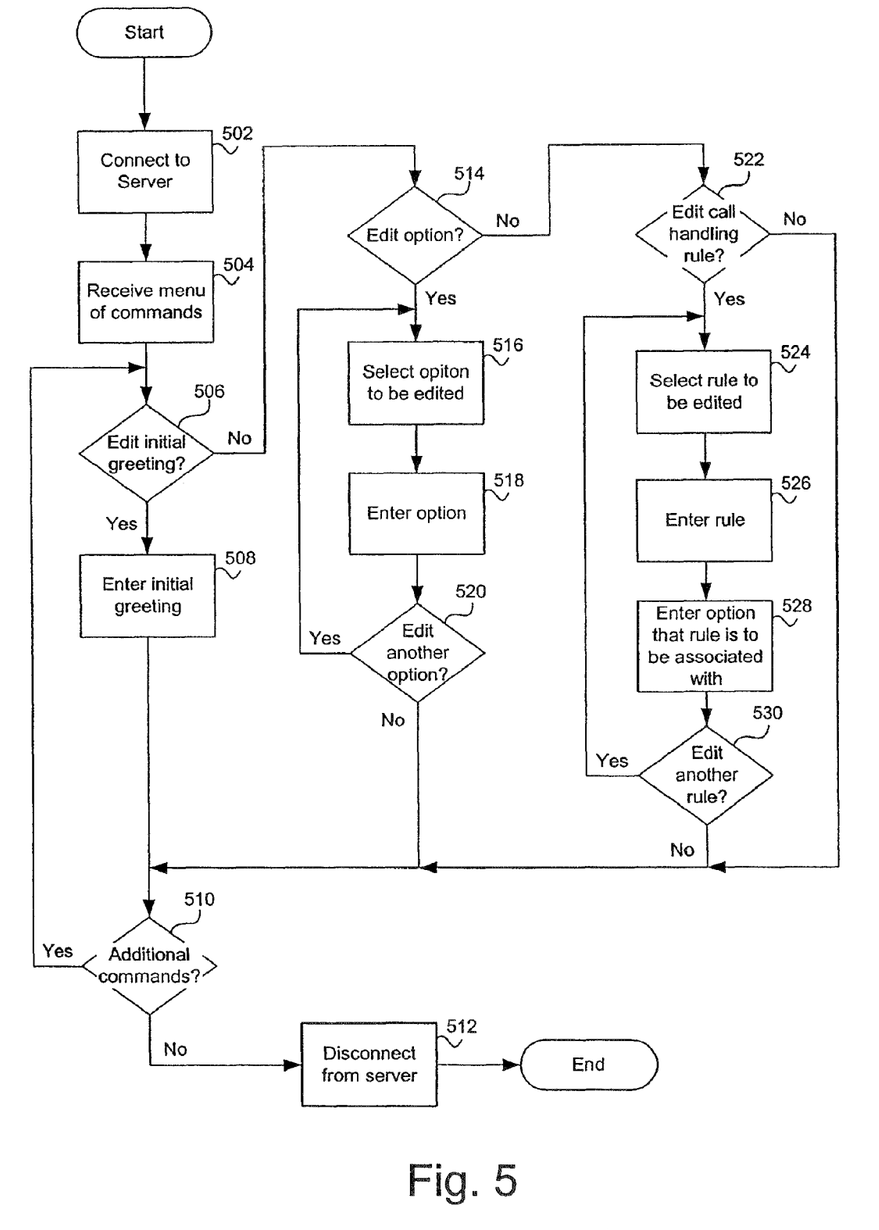
FIG. 5 is a flow diagram illustrating an exemplary method for implementing an exemplary system of the present invention.

FIG. 5 is an exemplary flow chart for a method according to an embodiment of the present invention. The user accesses the user's personal IVR service by connecting to a server via a web-based interface, block 502. The server receives the user's request and may execute some authentication process, such as asking for a personal identification number (PIN) before allowing the user access to a personal IVR service.

After verifying that the user is a subscriber to the personal IVR service, the user's access is granted. The server provides a menu of commands to the user, block 504, from which the user chooses to enter a selection. For example, the user may choose to edit an initial greeting, edit an option, or edit a call handling rule associated with an initial greeting or option. Edit should be understood to include creating, deleting, or otherwise changing an initial greeting, option, or call handling rule. If the user wants to edit an initial greeting, block 506, the user is prompted to enter the initial greeting, block 508. Depending on the device utilized by the user to access the personal IVR service, the user may type in the text of a greeting or may record a greeting by speaking the greeting. After the user enters the greeting, the user may perform another command, block 510. If the user does not want to enter additional commands, the user disconnects from the server, block 512.

The user may choose to edit an option, block 514. The user may choose to edit an option rather than editing the initial greeting when doing so is desirable. For example, if the initial greeting includes an option stating "if you are interested in the car for sale, press 4" and the car has been sold, the user may want to delete this option. The user can delete this option either by choosing to edit an initial greeting or choosing to edit an option. Choosing to edit an option may be advantageous if the user is only interested in editing a single option and not multiple portions of the initial greeting. The user selects the option to be edited, block 516, and the option is retrieved and presented to the user for confirmation. The user edits the option, block 518. In an embodiment, if the user deletes an option, then all call handling rules associated with the deleted option are also deleted. Once the user has edited the option, the user is prompted whether the user wants to edit another option, block 520, or enter additional commands, block 510.

Once the user edits the option, the user is prompted whether the user wants to edit a call handling rule associated with the selected option, block 520. If the user does not want to edit a call handling rule, the user is prompted to enter additional commands, block 510, and is disconnected from the server, block 512, if the user does not wish to enter any additional commands.

If the user desires to edit a call handling rule, block 522, the user is prompted to select a rule to be edited, block 524. The user enters the rule to be edited, block 526. One example of a rule is to forward a call to a directory number. Even more specific is a rule that provides for forwarding a call to directory number A from 8:00 a.m. to noon, forwarding a call to directory number B from noon to 6:00 p.m., ringing the dialed directory number from 6:00 p.m. to 10:00 p.m. and from 6:00 a.m. to 8:00 a.m., and forwarding a call to voice mail from 10:00 p.m. to 6:00 a.m. Another example of a rule is to play a specific announcement. Accordingly, as part of editing a call handling rule, the user would enter the text to be played. For example, the user may desire the text to be played to be directions to the user's house for an upcoming party.

Once the user has entered the rule, the user enters an option with which the rule is to be associated, block 528. For example, if the user has set up an option to play text consisting of directions to the user's house for an upcoming party, then the user associates the rule containing the text to be played with that option. As another example, if an option is "press or say 2 for Mary," then the user associates the rule with Mary's forwarding numbers, etc. with that option. Once the user has edited a rule, the user is prompted whether the user wants to edit another rule, block 530, or enter additional commands, block 510.

If the user enters a command that is not recognized by the server, an error message is displayed and the user is prompted to enter another command. Likewise, an error message may be displayed if the user enters a rule that is inconsistent (e.g., forward call to forwarding number A from noon to midnight and forward call to forwarding number B from midnight to 2:00 p.m.) or otherwise enters inconsistent data.

Figure 6:
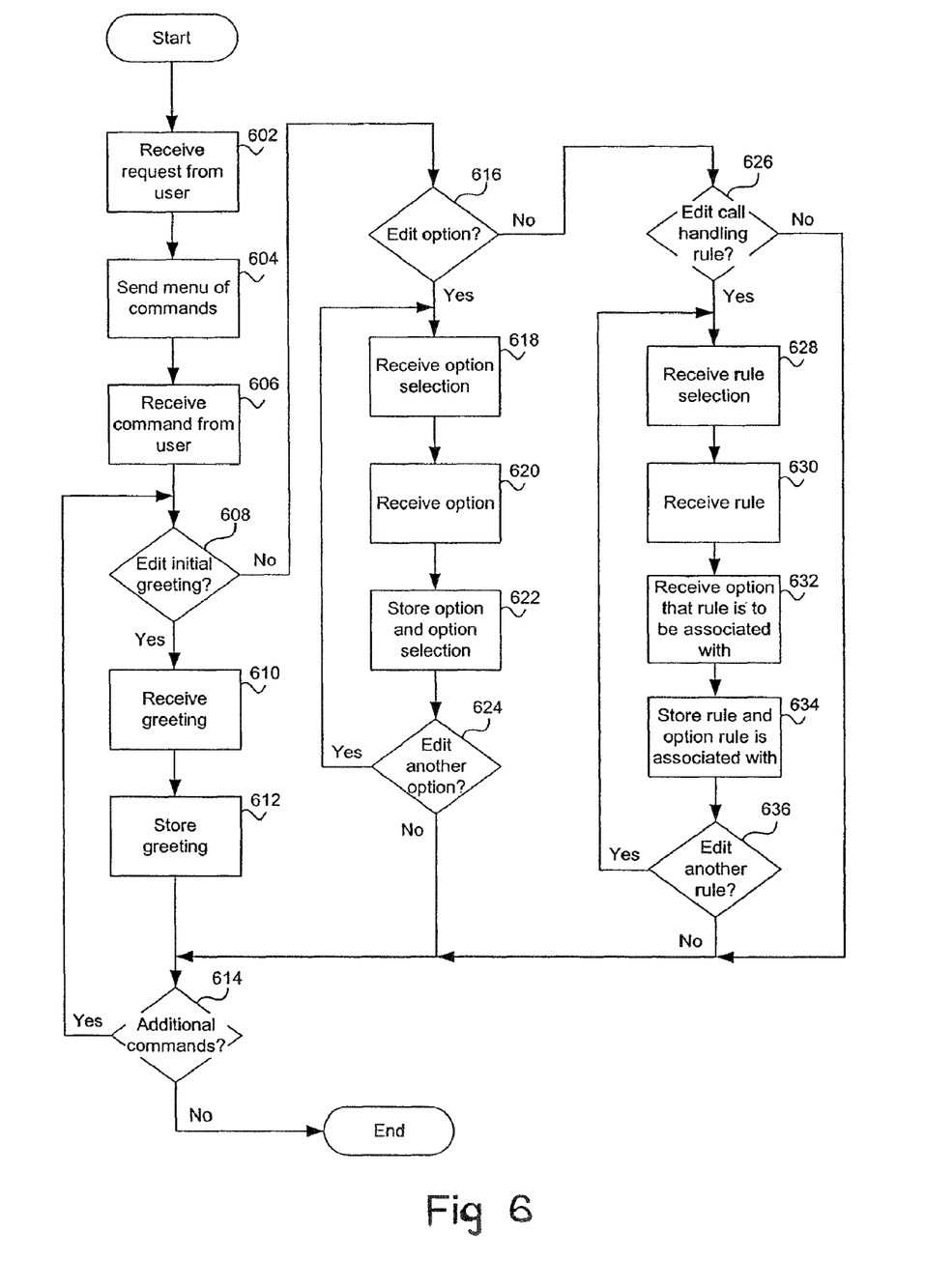
FIG. 6 is a flow diagram showing an exemplary method of operation of the present invention.

FIG. 6 is an exemplary flow chart for a method according to an embodiment of the present invention. A server or other platform where an IVR service is implemented receives an access request from a user, block 602, and the server may invoke an authentication process before allowing the user to create or modify the user's personal IVR service. After the user provides a proper PIN or other identification information, the server sends a menu of commands to the user for the user's personal IVR service, block 604, and asks the user to enter a command.

The server receives a command from the user, block 606, and determines the command received from the user. If the user wants to edit an initial greeting, block 608, the server prompts the user to enter the initial greeting. Edit should be understood to include creating, deleting, or otherwise changing an initial greeting, option, or call handling rule. The server receives an initial greeting, block 610, and stores the greeting, block 612. After the initial greeting is stored, the server checks whether the user wants to enter another command, block 614.

If the user's command is to edit an option, block 616, the server prompts the user to enter the option to be edited and the server receives the option selection, block 618, and the option, block 620. The server stores the option selection and option, block 622, and queries whether the user wishes to edit another option, block 624, or enter another command, block 614.

If the user's command is to edit a call handling rule, block 626, the server prompts the user to enter the call handling rule to be edited. The server receives the rule selection, block 628, and the rule, block 630. The server also receives the option with which the edited rule is to be associated, block 632, and stores the rule, block 634, including which option is associated with the rule. The server queries whether the user wants to edit another call handling rule, block 636, or enter another command, block 614. If the server receives a command that it does not recognize, the server displays an error message and prompts the user to enter another command.

Figure 7:
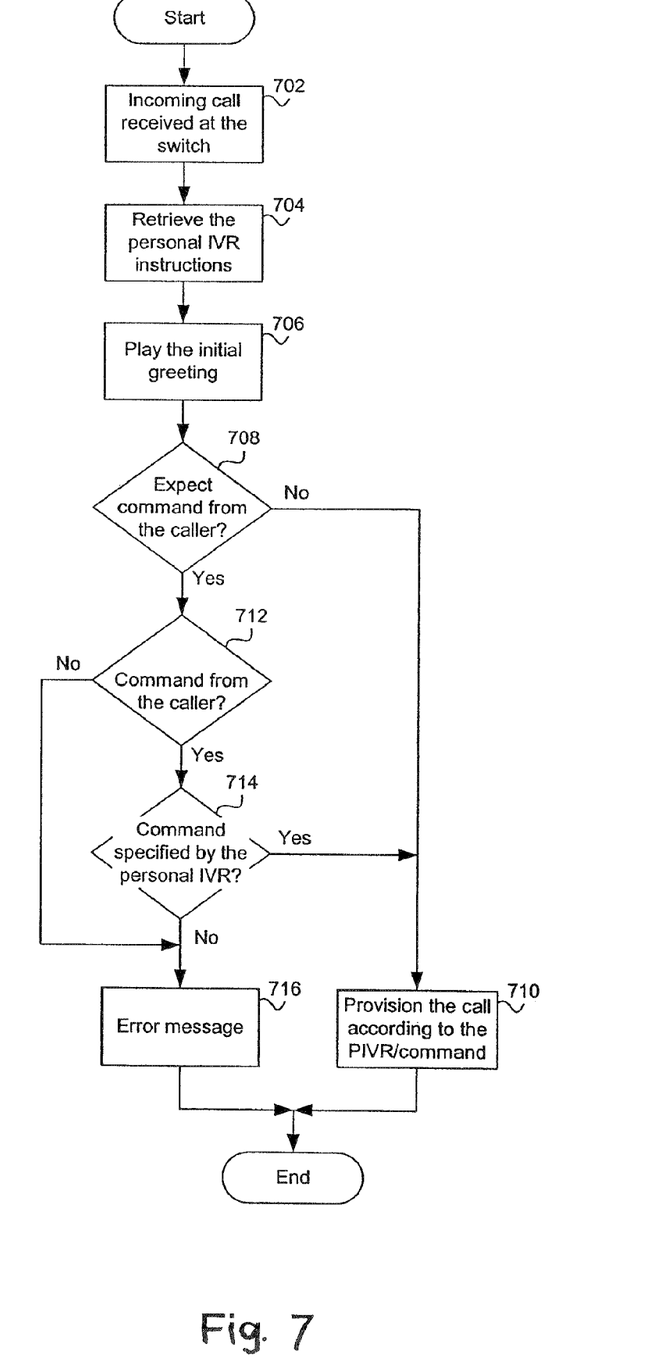
FIG. 7 is a flow diagram illustrating an exemplary method of call processing of the present invention.

FIG. 7 is a flow chart illustrating an embodiment of the present invention. The switch serving the called party or user receives an incoming call, block 702, and determines whether the user is subscribed to personal IVR service. The call is routed to the VXML gateway/voice server where the user's personal IVR service is stored. The server retrieves the personal IVR greetings, options, and rules, block 704, and plays an initial greeting to the caller, block 706. If the server does not expect any input from the caller, block 708, the call is provisioned according to the call handling rules of the personal IVR service, block 710. For example, the initial greeting may indicate that the called party is away from the phone and the call will be forwarded directly to voice mail. In this case, the server does not expect a selection of any options or other input from the user after the initial greeting is played, and thus the server routes the call directly to voice mail according to a call handling rule of the personal IVR service.

If the server expects input from the caller, block 708, the server waits for entry of a command by the caller, block 712. If the caller does not enter a command, the server plays an error message, block 716. If the caller enters a command, the server determines whether the command is one specified by the personal IVR service, block 714. For example, the initial greeting may state "Press 1 for Mary; or press 2 for Jim." If the caller presses 3, the server does not recognize this as a proper command based on the personal IVR service. If the command entered by the caller is not recognized by the server, an error message is played to the caller, block 716. If the command entered by the caller is proper, the call is provisioned according to the personal IVR service, block 710. For example, if the caller enters "1" for Mary and a call handling rule associated with option "1" is to route the call to Mary's mobile phone number, the call is routed to Mary's mobile phone when the caller presses "1."

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for administering a personal interactive voice response service, comprising:
   retrieving a greeting associated with a calling number and with a called number;
   receiving a response from the calling number;
   retrieving stored information associated with the response and with the called number; and
   retrieving a distinctive ringing pattern associated with the response and with the calling number.

2. The method according to claim 1, wherein receiving the response comprises receiving a voice response.

3. The method according to claim 1, wherein receiving the response comprises receiving a dual tone modal frequency response.

4. The method according to claim 1, further comprising prompting for the response.

5. The method according to claim 1, further comprising recording the greeting.

6. The method according to claim 1, further comprising presenting the greeting.

7. The method according to claim 1, wherein retrieving the stored information comprises retrieving a recorded message to be played to the calling number.

8. The method according to claim 1, wherein retrieving the stored information comprises retrieving text.

9. The method according to claim 8, further comprising playing the text to the calling number using text-to-speech conversion.

10. The method according to claim 1, further comprising exchanging a message between the called number and the calling number.

11. The method according to claim 1, further comprising processing call from the calling number to the called number.

12. The method according to claim 1, further comprising retrieving a rule associated with the called number.

13. The method according to claim 1, further comprising processing the distinctive ringing pattern.

14. The method according to claim 1, further comprising storing a web-based interface.

15. The method according to claim 1, further comprising storing a profile associated with the called number.

16. The method according to claim 1, further comprising storing a profile associated with the calling number.

17. A server administering a personal interactive voice response service, the server operative to:
   retrieve a greeting associated with a calling number and with a called number;
   receive a response from the calling number;
   retrieve stored information associated with the response and with the called number; and
   retrieve a distinctive ringing pattern associated with the response and with the calling number.

18. The server according to claim 17, further operative to retrieve a recorded message to be played to the calling number.

19. A non-transitory computer-readable medium on which is encoded instructions that when carried out by a computer processor perform a method, the method comprising:
- retrieving a greeting associated with a calling number and with a called number;
- receiving a response from the calling number;
- retrieving stored information associated with the response and with the called number; and
- retrieving a distinctive ringing pattern associated with the response and with the calling number.

20. The non-transitory computer-readable medium according to claim 19, further comprising instructions for at least one of retrieving a recorded message to be played to the calling number and retrieving text.

* * * * *